US009110667B2

(12) United States Patent
Shirota et al.

(10) Patent No.: US 9,110,667 B2
(45) Date of Patent: Aug. 18, 2015

(54) CONTROL SYSTEM, CONTROL METHOD, AND COMPUTER PROGRAM PRODUCT

(75) Inventors: Yusuke Shirota, Kanagawa (JP); Tetsuro Kimura, Tokyo (JP); Tatsunori Kanai, Kanagawa (JP); Haruhiko Toyama, Kanagawa (JP); Koichi Fujisaki, Kanagawa (JP); Junichi Segawa, Kanagawa (JP); Masaya Tarui, Kanagawa (JP); Satoshi Shirai, Kanagawa (JP); Hiroyoshi Haruki, Kanagawa (JP); Akihiro Shibata, Tokyo (JP)

(73) Assignee: Kabushiki Kaisha Toshiba, Tokyo (JP)

( * ) Notice: Subject to any disclaimer, the term of this patent is extended or adjusted under 35 U.S.C. 154(b) by 383 days.

(21) Appl. No.: 13/546,246

(22) Filed: Jul. 11, 2012

(65) Prior Publication Data

US 2013/0080812 A1 Mar. 28, 2013

(30) Foreign Application Priority Data

Sep. 22, 2011 (JP) ................... 2011-206962

(51) Int. Cl.
*G06F 1/32* (2006.01)
*G06F 12/08* (2006.01)

(52) U.S. Cl.
CPC .......... *G06F 1/3275* (2013.01); *G06F 12/0862* (2013.01); *G06F 2212/1028* (2013.01); *Y02B 60/1225* (2013.01); *Y02B 60/1228* (2013.01); *Y02B 60/32* (2013.01)

(58) Field of Classification Search
CPC .............. G06F 1/3275; G06F 12/0862; G06F 2212/1028; Y02B 60/1225; Y02B 60/1282; Y02B 60/32
See application file for complete search history.

(56) References Cited

U.S. PATENT DOCUMENTS

| 7,869,835 | B1 | 1/2011 | Zu |
| 7,934,054 | B1 * | 4/2011 | Moll et al. ................... 711/113 |
| 2006/0225046 | A1 * | 10/2006 | Feekes ......................... 717/127 |
| 2011/0283124 | A1 * | 11/2011 | Branover et al. ............ 713/323 |
| 2012/0117407 | A1 | 5/2012 | Kanai et al. |
| 2012/0151119 | A1 | 6/2012 | Yoshida et al. |
| 2012/0246356 | A1 | 9/2012 | Shibata et al. |
| 2012/0246390 | A1 | 9/2012 | Kanai et al. |
| 2012/0246501 | A1 | 9/2012 | Haruki et al. |
| 2012/0246503 | A1 | 9/2012 | Fujisaki et al. |
| 2013/0073812 | A1 | 3/2013 | Kanai et al. |
| 2013/0080813 | A1 | 3/2013 | Tarui et al. |
| 2013/0091372 | A1 | 4/2013 | Kimura et al. |

OTHER PUBLICATIONS

Kondo, et al.; "An Architectural Support for Compiler-Directed Fine Grain Power-Gating", 2009, ARC-184, No. 14.
Office Action for Japanese Patent Application No. 2011-206962 Dated Jun. 10, 2014, 5 pgs.
Japanese Office Action for Japanese Patent Application No. 2011-206962 mailed on Sep. 2, 2014.

* cited by examiner

*Primary Examiner* — Dennis M Butler
(74) *Attorney, Agent, or Firm* — Amin, Turocy & Watson, LLP

(57) ABSTRACT

According to an embodiment, a control system includes a processing device; a main storage device to store the data; a cache memory to store part of the data stored; a prefetch unit to predict data highly likely to be accessed and execute prefetch, reading out data in advance onto the cache memory; and a power supply unit. The system further includes: a detecting unit to detect whether the processing device is in an idle state; a determining unit that determines whether to stop the supply of power to the cache memory in accordance with the state of the prefetch when determined as idle state; and a power supply control unit that controls the power supply unit so as to stop the supply of power, or controls the power supply unit so as to continue the supply of power.

13 Claims, 8 Drawing Sheets

CONTROL SYSTEM, CONTROL METHOD, AND COMPUTER PROGRAM PRODUCT

CROSS-REFERENCE TO RELATED APPLICATION

This application is based upon and claims the benefit of priority from Japanese Patent Application No. 2011-206962, filed on Sep. 22, 2011; the entire contents of which are incorporated herein by reference.

FIELD

Embodiments described herein relate generally to a control system, a control method, and a computer program product.

BACKGROUND

In recent years, in a wide range of computer systems ranging from handheld information devices such as cellular phones, a slate terminals or tablet terminals to large-scale systems such as supercomputers, a reduction of system power consumption has become an important issue. As a way of reducing power consumption, for example, a power gating technique of supplying power to only portions (units) which require power is known.

For example, in an idle state where the processor of a computer system executes nothing, it is possible to reduce power consumption by stopping the supply of power to a cache memory in which part of a plurality of pieces of data used for processing by the processor are stored.

The computer system described above generally includes a prefetch (or, pre-fetch) function which involves predicting data which is highly likely to be used by a processor in the near future among a plurality of pieces of data stored in a main storage device and reading out the predicted data in advance onto a cache memory. Here, for example, regardless of the fact that the data read out by prefetch (or, pre-fetch) is stored in a cache memory, when the supply of power to the cache memory is stopped, the data read out onto the cache memory by the prefetch will be removed. Thus, in order to use the data, it is necessary to read out the data again onto the cache memory. As a result, there is a problem in that power used for prefetch is consumed unnecessarily.

DETAILED DESCRIPTION

According to an embodiment, a control system includes a processing device that processes data; a main storage device that stores a plurality of pieces of the data; a cache memory that stores part of the plurality of pieces of the data stored in the main storage device; a prefetch unit that predicts data which is highly likely to be accessed in future among the plurality of pieces of data stored in the main storage device to thereby execute prefetch which involves reading out data in advance onto the cache memory; a power supply unit that supplies power. The control system further includes a detecting unit that detects whether the processing device is in an idle state where the processing device is not executing the processing; a determining unit that determines whether to stop the supply of power to the cache memory in accordance with the state of the prefetch when the processing device is determined to be in the idle state; and a power supply control unit that controls the power supply unit so as to stop the supply of power to the cache memory when it is determined to stop the supply of power to the cache memory and controls the power supply unit so as to continue the supply of power to the cache memory when it is determined not to stop the supply of power to the cache memory.

Hereinafter, embodiments of a control system, a control method, and a computer program product according to the present invention will be described in detail with reference to the accompanying drawings.

First Embodiment

Figure 1:
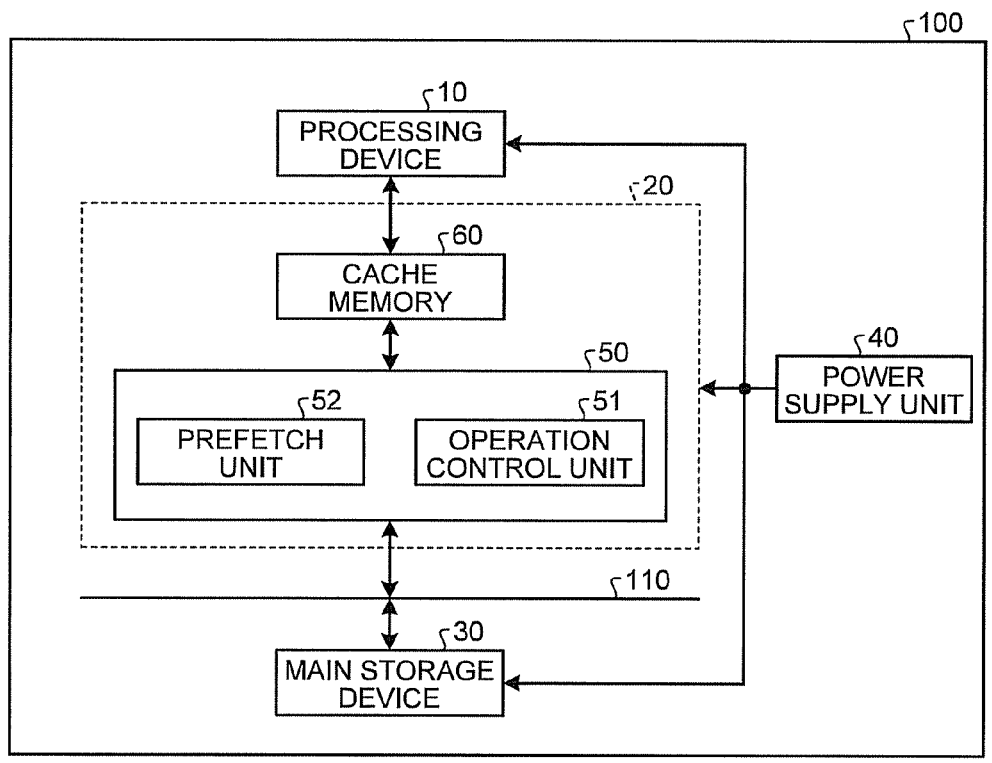
FIG. 1 is an exemplary block diagram of a control system according to a first embodiment.

FIG. 1 is an exemplary block diagram illustrating a schematic configuration example of a control system 100 according to a first embodiment. As illustrated in FIG. 1, the control system 100 is configured to include a processing device 10, a cache unit 20, a main storage device 30, and a power supply unit 40 that supplies power. The cache unit 20 and the main storage device 30 are connected via a bus 110. Although not illustrated in detail, the control system 100 of the present embodiment also includes an external storage device such as a ROM, an HDD, or an SSD, a display device such as a display, an input device such as a mouse or a keyboard, and a communication I/F device, and has a hardware configuration using a general computer.

The processing device 10 processes data. The processing device 10 executes various processes and controls the operation of the entire control system 100. The processing device 10 may be configured as a control device such as a CPU (central processing unit), for example. The main storage device 30 stores a plurality of pieces of data used for the processes executed by the processing device 10.

The cache unit 20 is configured to include a cache controller 50 and a cache memory 60. The cache controller 50 includes an operation control unit 51 and a prefetch unit 52. The operation control unit 51 controls an operation of reading out data from the main storage device 30, an operation of writing data to the cache memory 60, and other operations. The prefetch unit 52 predicts data which is highly likely to be accessed in future among a plurality of pieces of data stored in the main storage device 30 and executes prefetch which involves reading out the data in advance onto (loading) the cache memory 60. More specifically, the prefetch unit 52 reads out data, which is selected by a prediction algorithm based on the memory access history of the processing device 10, in advance onto the cache memory 60.

Figure 2:
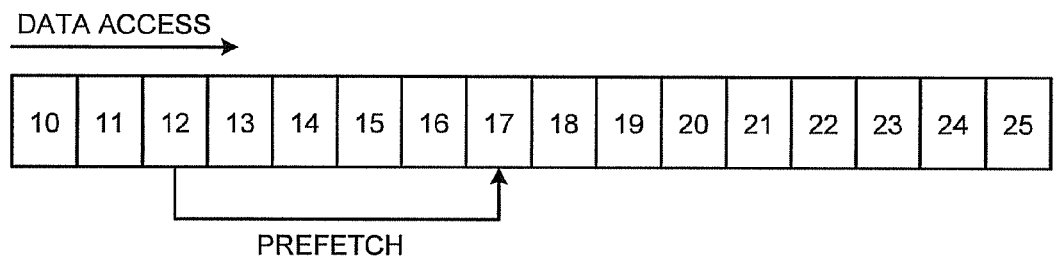
FIG. 2 is an exemplary conceptual diagram illustrating an example of a prediction algorithm according to the first embodiment.

FIG. 2 is an exemplary conceptual diagram illustrating an example of a prediction algorithm. In the example of FIG. 2, since the processing device 10 accesses data in the order of data denoted by the numbers 10, 11, and 12, the prefetch unit 52 predicts that the access by the processing device 10 is executed in numerical order. Moreover, the prefetch unit 52 selects data sequentially from the data denoted by the number 17 as the data which is highly likely to be accessed in future and reads out the selected data onto the cache memory 60. In this example, although a prediction algorithm that predicts one data stream (access line) accessed in sequence has been described as an example, the prediction algorithm is not limited to this. The prediction algorithm may be an optional prediction algorithm that predicts data which is highly likely to be accessed in future, and the type of algorithm is optional. For example, when the processing device 10 accesses data in an interleaved manner, the prediction algorithm may predict a plurality of access lines (data streams) at a time and may predict stride access where data is accessed in an alternate manner.

Figure 3:
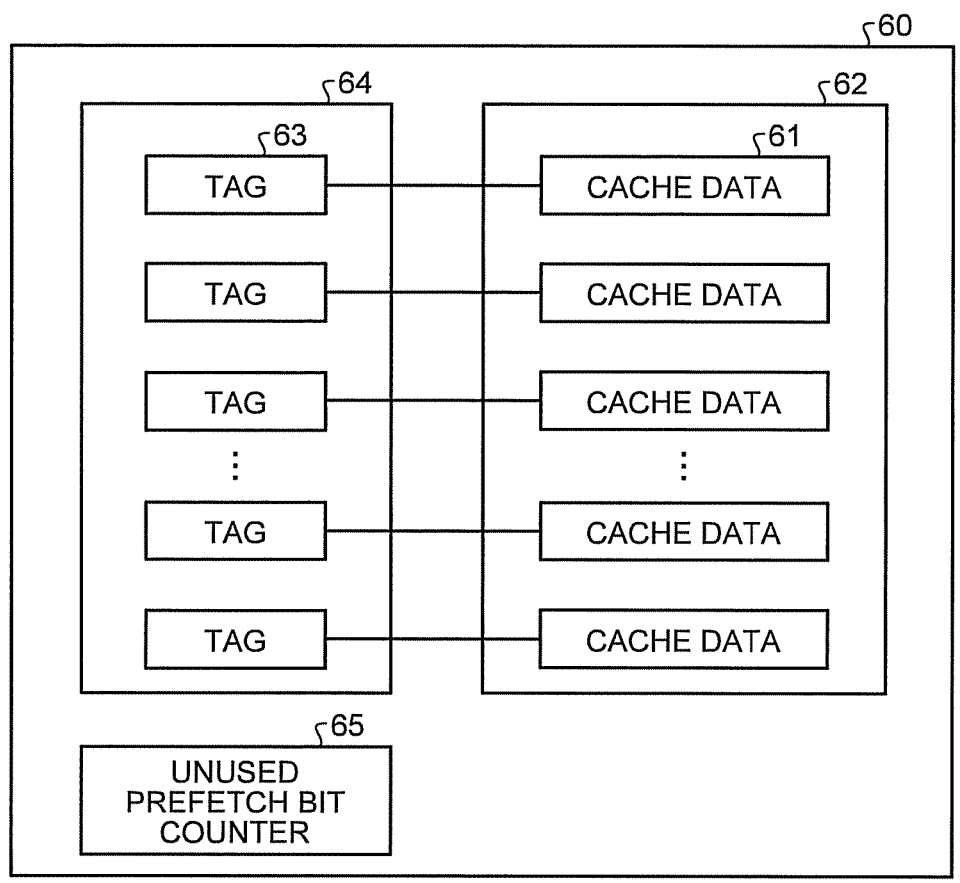
FIG. 3 is an exemplary block diagram of a cache memory according to the first embodiment.

The description is continued by returning to FIG. 1. The cache memory 60 stores part of a plurality of pieces of data stored in the main storage device 30. The cache memory 60 is configured as a volatile memory such as a static RAM (random access memory), for example, and the content stored therein disappears when the supply of power is stopped. FIG. 3 is an exemplary block diagram illustrating a configuration example of the cache memory 60. The cache memory 60 includes a data array unit 62 in which cached data (hereinafter referred to as "cache data") 61 is arranged and stored, a tag array unit 64 in which a plurality of tags 63 corresponding to a plurality of pieces of cache data 61 in a one-to-one manner are stored, and an unused prefetch bit counter 65.

Figure 4:
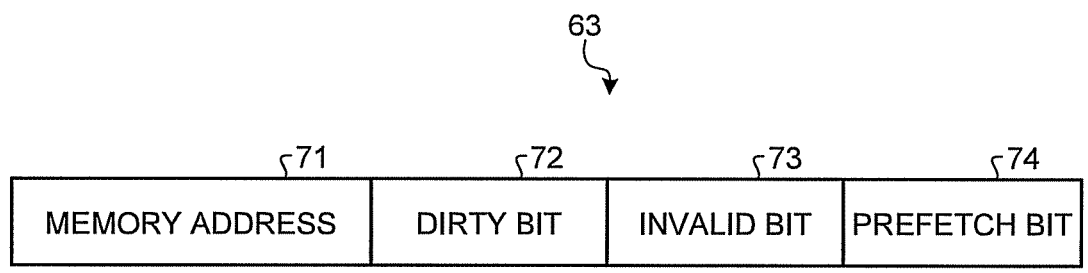
FIG. 4 is an exemplary diagram illustrating a configuration example of a tag according to the first embodiment.

FIG. 4 is an exemplary diagram illustrating a configuration example of the tag 63. As illustrated in FIG. 4, the tag 63 is configured to include a memory address 71, a dirty bit 72, an invalid bit 73, and a prefetch bit 74. The memory address 71 is information representing the position (block) of the corresponding main storage device 30. The dirty bit 72 is information representing whether the content of the cache data 61 is identical to the content of data stored in the main storage device 30 at a position indicated by the memory address 71. In this example, when the content of the cache data 61 is not identical to the content of data stored in the main storage device 30 at the position indicated by the memory address 71, the dirty bit is set to "1". When the content of the cache data 61 is identical to the content of data stored in the main storage device 30 at the position indicated by the memory address 71, the dirty bit is set to "0". The invalid bit is information representing whether the corresponding cache data 61 is stored in the data array unit 62. When the cache data 61 is stored in the data array unit 62, the invalid bit is set to "0". When the cache data 61 is not stored in the data array unit 62, the invalid bit is set to "1".

The prefetch bit 74 is information representing whether the corresponding cache data 61 is the data which is read out onto the cache memory 60 by prefetch. When the cache data 61 is the data which is read out onto the cache memory 60 by prefetch, the prefetch bit 74 is set to "1", representing that the prefetch bit 74 is valid. When the cache data 61 is not the data which is read out onto the cache memory 60 by prefetch, the prefetch bit 74 is set to "0", representing that the prefetch bit 74 is invalid. Moreover, when the cache data 61 read out onto the cache memory 60 by prefetch is accessed by the processing device 10, the prefetch bit corresponding to the cache data 61 is changed from "1" to "0".

In the present embodiment, when data of the main storage device 30 is read out onto the cache memory 60 by prefetch, the cache controller 50 (the prefetch unit 52) stores the read data in the tag array unit 64, creates the tag 63 corresponding to the read data, and stores the tag 63 in the tag array unit 64. Moreover, in the present embodiment, when the cache data 61 read out onto the cache memory 60 by prefetch is accessed by the processing device 10, the cache controller 50 (the operation control unit 51) changes the prefetch bit 74 corresponding to the cache data 61 from "1" to "0".

The unused prefetch bit counter 65 counts the number of pieces of the cache data 61 read out onto the cache memory 60 by prefetch. More specifically, the unused prefetch bit counter 65 counts the total number of the tags 63 in which the prefetch bit 74 is set to "1".

Figure 5:
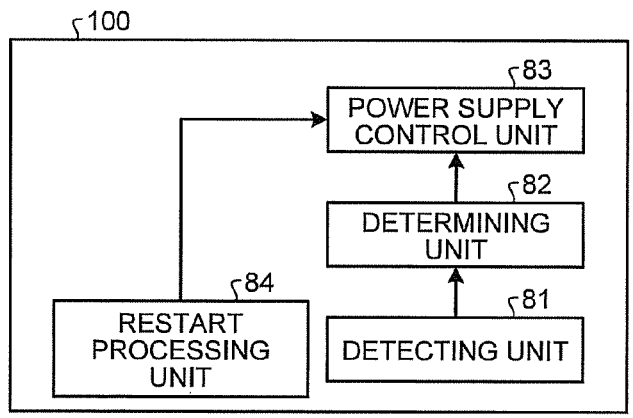
FIG. 5 is an exemplary functional block diagram of the control system according to the first embodiment.

FIG. 5 is an exemplary block diagram illustrating functions realized when the processing device 10 executes programs stored in a HDD (not illustrated) or the like. That is, FIG. 5 can be regarded as a functional block diagram of the control system 100. As illustrated in FIG. 5, the functions of the control system 100 include a detecting unit 81, a determining unit 82, a power supply control unit 83, and a restart processing unit 84. At least part of these functions may be realized as individual circuits (hardware).

The detecting unit 81 detects whether the processing device 10 is in an idle state where it does not execute processes. When the detecting unit 81 detects that the processing device 10 is in the idle state, the determining unit 82 determines whether to stop the supply of power to the cache memory 60 in accordance with the state of the prefetch. In the present embodiment, when the number of pieces of the cache data 61 read out onto the cache memory 60 by prefetch is smaller than a threshold value, the determining unit 82 determines to stop the supply of power to the cache memory 60. On the other hand, when the number of pieces of the cache data 61 read out onto the cache memory 60 by prefetch is not smaller than the threshold value, the determining unit 82 determines to continue (not stop) the supply of power to the cache memory 60.

More specifically, when the count value of the unused prefetch bit counter 65 is smaller than the threshold value, the determining unit 82 determines to stop the supply of power to the cache memory 60. On the other hand, when the count value of the unused prefetch bit counter 65 is not smaller than the threshold value, the determining unit 82 determines not to stop the supply of power to the cache memory 60. The threshold value can be set to an optional value. Since the threshold value depends on the performance of respective component modules of the control system 100, it is preferable to employ a value ideal for the control system 100. For example, when the processing device 10 accesses data in an interleaved manner, a half of the maximum number of pieces of data which can be prefetched (this represents that two of three access lines can be predicted) may be employed as the threshold value. When a restart speed is important, a small value such as 1 may be employed as the threshold value. Moreover, a value obtained by adjusting through experiments may be employed as the threshold value.

When the determining unit 82 determines to stop the supply of power to the cache memory 60, the power supply control unit 83 controls the power supply unit 40 so as to stop the supply of power to the cache memory 60. On the other hand, when the determining unit 82 determines not to stop the supply of power to the cache memory 60, the power supply control unit 83 controls the power supply unit 40 so as to continue the supply of power to the cache memory 60.

When a predetermined restart (resume) factor is received in a state where the supply of power to the cache memory 60 is stopped, the restart processing unit 84 controls the power supply unit 40 so as to restart the supply of power to the cache memory 60. The kind of the restart (resume) factor is optional, and for example, an interrupt process may be the restart (resume) factor. In this case, when an interrupt process is performed in a state where the supply of power to the cache memory 60 is stopped, the restart processing unit 84 controls the power supply unit 40 so as to restart the supply of power to the cache memory 60.

Figure 6:
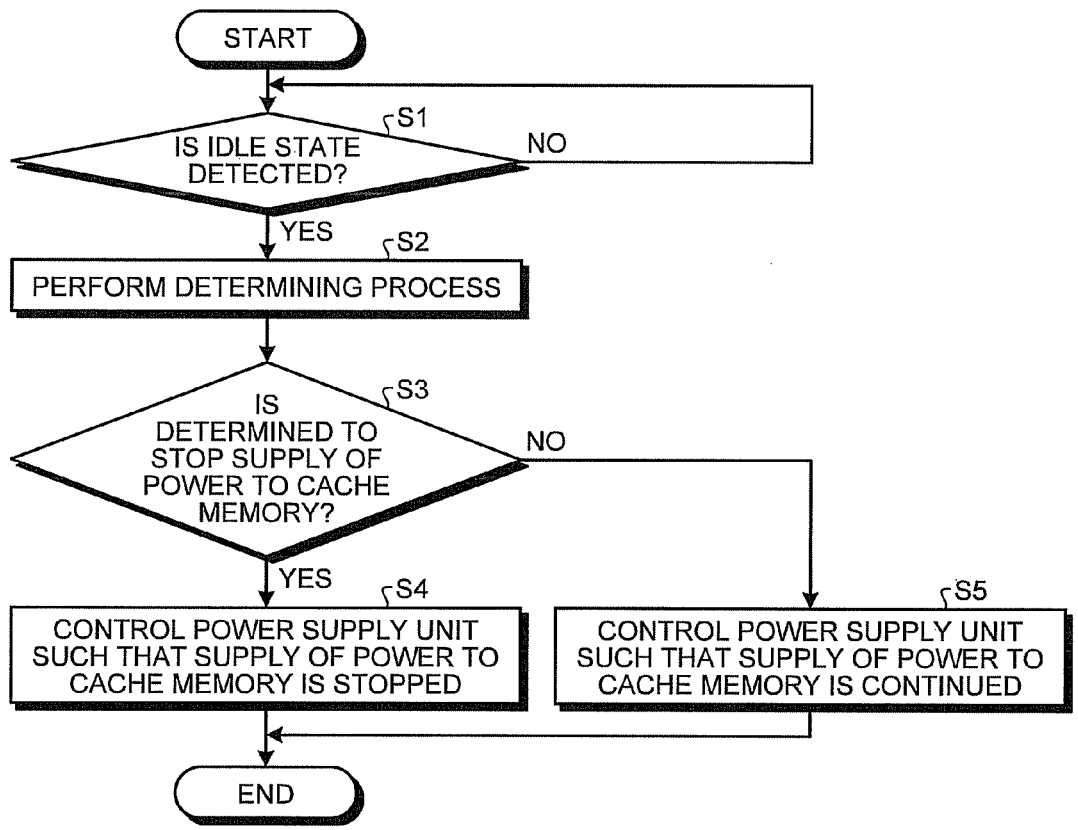
FIG. 6 is an exemplary flowchart illustrating an example of a power supply control process according to the first embodiment.

FIG. 6 is an exemplary flowchart illustrating an example of a power supply control process executed by the control system 100. The power supply control process is realized when the processing device 10 executes a predetermined software program. As illustrated in FIG. 6, when the detecting unit 81 detects that the processing device 10 is in the idle state (YES in step S1), the determining unit 82 executes a determining process (step S2).

Figure 7:
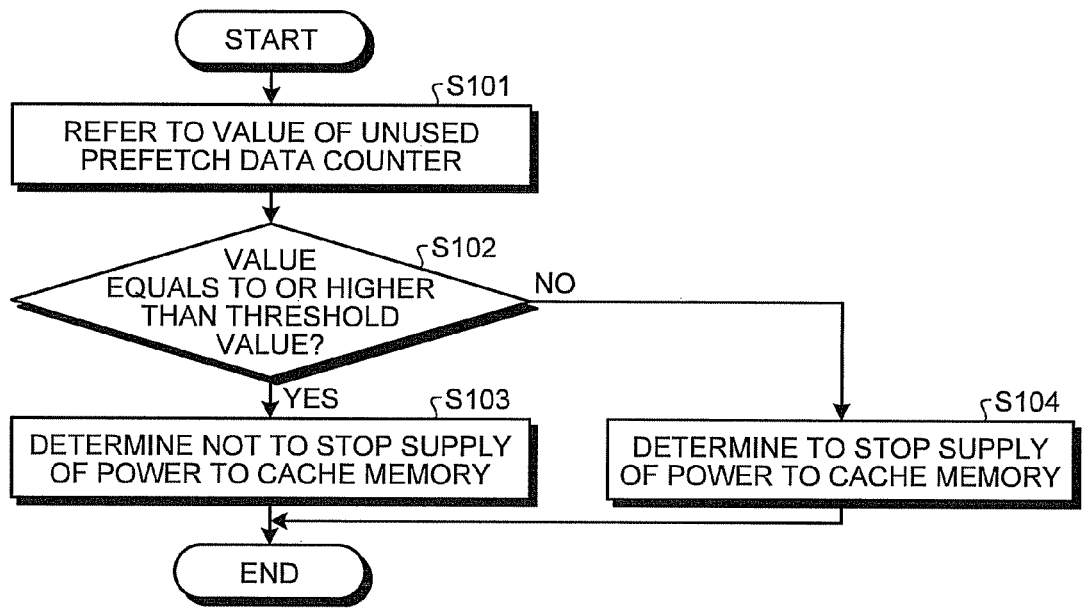
FIG. 7 is an exemplary flowchart illustrating an example of a determining process according to the first embodiment.

FIG. 7 is an exemplary flowchart illustrating an example of the determining process in step S2. As illustrated in FIG. 7, first, the determining unit 82 refers to the count value of the unused prefetch bit counter 65 (step S101). Subsequently, the determining unit 82 determines whether the count value (the total number of the tags 63 in which the prefetch bit 74 is set to "1") of the unused prefetch bit counter 65 is not smaller than the threshold value (step S102). When the count value of the unused prefetch bit counter 65 is not smaller than the threshold value (YES in step S102), the determining unit 82 determines not to stop the supply of power to the cache memory 60 (step S103). On the other hand, when the count value of the unused prefetch bit counter 65 is smaller than the threshold value (NO in step S102), the determining unit 82 determines to stop the supply of power to the cache memory 60 (step S104). The determining process has been described above.

The description is continued by returning again to FIG. 6. As the result of the determining process in step S2, when it is determined to stop the supply of power to the cache memory 60 (YES in step S3), the power supply control unit 83 controls the power supply unit 40 so as to stop the supply of power to the cache memory 60 (step S4). On the other hand, when it is determined not to stop the supply of power to the cache memory 60 (NO in step S3), the power supply control unit 83 controls the power supply unit 40 so as to continue the supply of power to the cache memory 60 (step S5).

As described above, in the present embodiment, when the number of pieces of the cache data 61 read out onto the cache memory 60 by prefetch is not smaller than the threshold value, since the supply of power to the cache memory 60 is not stopped even when the processing device 10 is in the idle state, it is possible to prevent unnecessary consumption of power used for prefetch.

Second Embodiment

Next, a second embodiment will be described. A determining unit 82 of the second embodiment is different from that of the first embodiment described above in that the determining unit 82 determines to stop the supply of power to a cache memory 60 if a prefetch unit 52 is unable to predict data which is highly likely to be accessed in future, and determines not to stop the supply of power to the cache memory 60 if the prefetch unit 52 is able to predict data which is highly likely to be accessed in future. The same portions as the first embodiment will not be described by denoting them by the same reference numerals.

Figure 8:
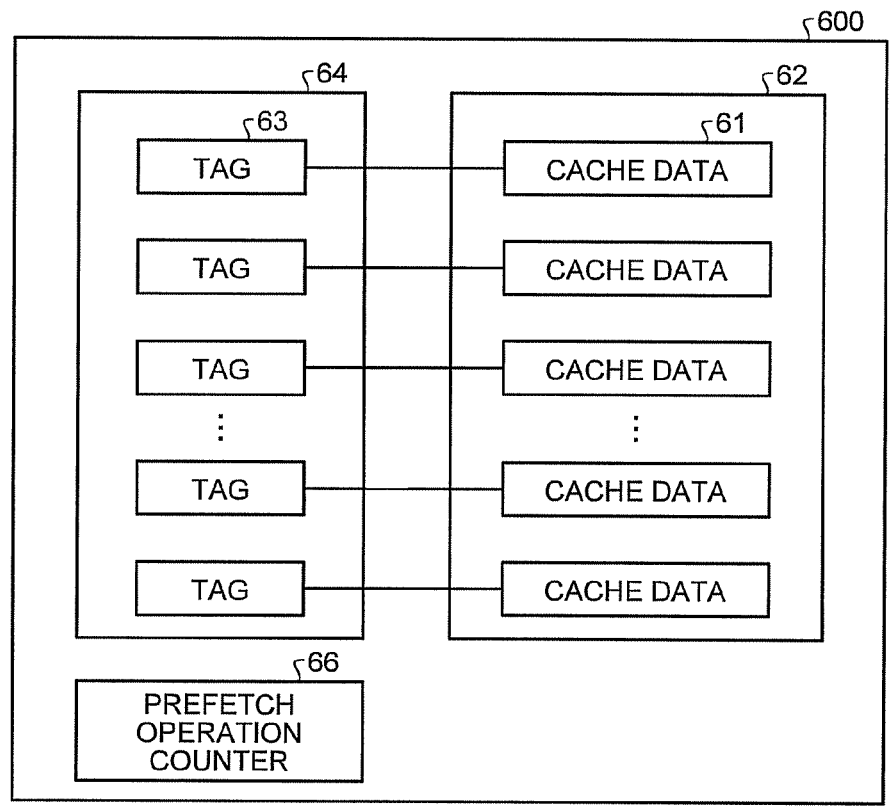
FIG. 8 is an exemplary block diagram of a cache memory according to a second embodiment.

FIG. 8 is an exemplary block diagram illustrating a configuration example of a cache memory 600 according to the second embodiment. As illustrated in FIG. 8, the cache memory 600 is different from that of the first embodiment in that a prefetch operation counter 66 is included in place of the unused prefetch bit counter 65 described above, and the other configurations are the same as those of the cache memory 60 of the first embodiment. In the present embodiment, when it is not possible to predict data which is highly likely to be accessed in future among a plurality of pieces of data stored in the main storage device 30, the prefetch unit 52 sets the count value of the prefetch operation counter 66 to "0". On the other hand, when it is possible to predict data which is highly likely to be accessed in future among the plurality of pieces of data stored in the main storage device 30, the prefetch unit 52 sets the count value of the prefetch operation counter 66 to "1". The invention is not limited to this, and for example, when the processing device 10 accesses data in an interleaved manner, the prefetch unit 52 may set the count value of the prefetch operation counter 66 to a value representing the number of access lines which can be predicted.

When the count value of the prefetch operation counter 66 is set to "1", the determining unit 82 of the present embodiment determines not to stop the supply of power to the cache memory 60. On the other hand, when the count value of the prefetch operation counter 66 is set to "0", the determining unit 82 determines to stop the supply of power to the cache memory 60. The invention is not limited to this, and for example, when the processing device 10 accesses data in an interleaved manner, the determining unit 82 may determine to continue the supply of power to the cache memory 60 when the count value of the prefetch operation counter 66 is not smaller than a threshold value and may determine to stop the supply of power to the cache memory 60 when the count value is smaller than the threshold value. In this case, the threshold value may be set to an optional value.

Figure 9:
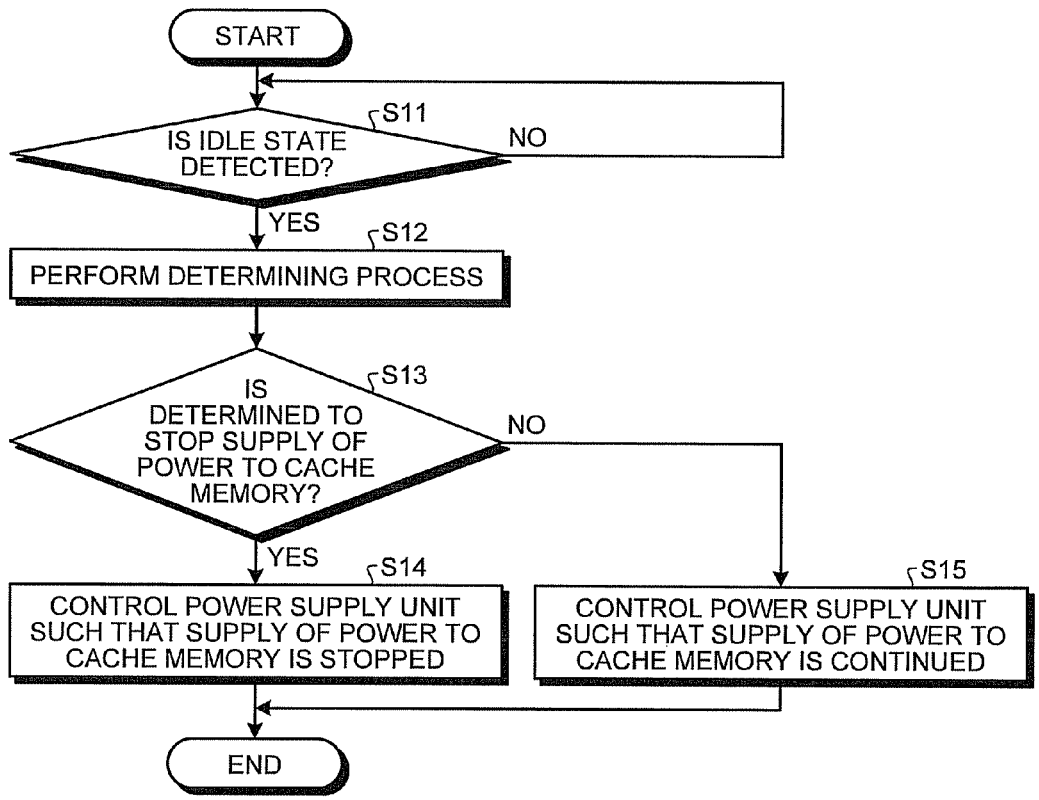
FIG. 9 is an exemplary flowchart illustrating an example of a power supply control process according to the second embodiment.

FIG. 9 is an exemplary flowchart illustrating an example of a power supply control process according to the second embodiment. Although the content of the determining process in step S12 is different from that of the first embodiment, the other contents are the same as those of the power supply control process according to the first embodiment.

Figure 10:
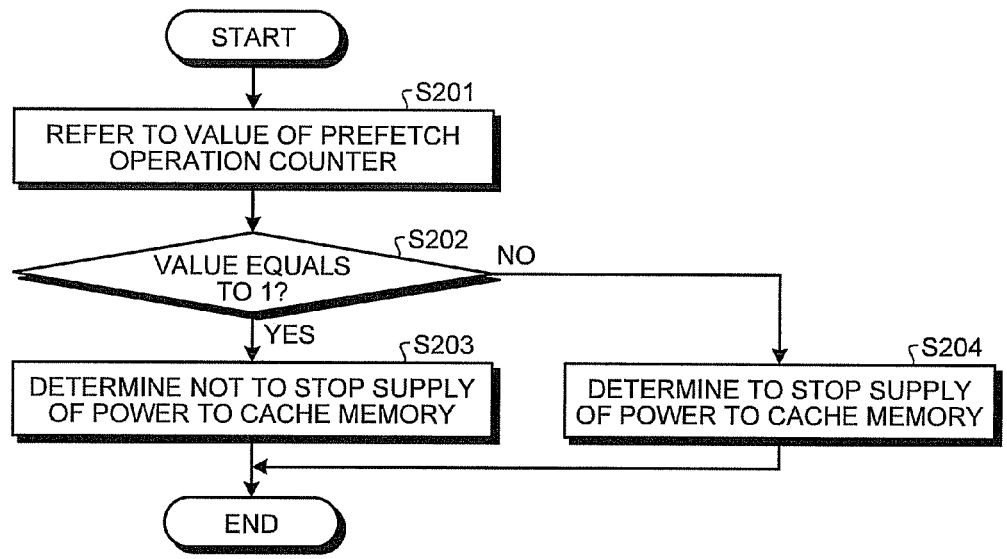
FIG. 10 is an exemplary flowchart illustrating an example of a determining process according to the second embodiment.

FIG. 10 is an exemplary flowchart illustrating an example of the determining process in step S12. As illustrated in FIG. 10, first, the determining unit 82 refers to the count value of the prefetch operation counter 66 (step S201). Subsequently, the determining unit 82 determines whether the count value of the prefetch operation counter 66 is "1" (step S202). That is, the determining unit 82 determines whether the prefetch unit 52 can predict the data which is highly likely to be accessed in future. When the count value of the prefetch operation counter 66 is "1" (YES in step S202), the determining unit 82 determines not to stop the supply of power to the cache memory 60 (step S203). On the other hand, when the count value of the prefetch operation counter 66 is smaller than a threshold value, the determining unit 82 determines to stop the supply of power to the cache memory 60 (step S204). The determining process has been described above.

As described above, in the present embodiment, when the prefetch unit 52 was able to predict the data which is highly likely to be accessed in future, since the supply of power to the cache memory 60 is not stopped even when the processing device 10 is in the idle state, it is possible to prevent unnecessary consumption of power used for prefetch.

Third Embodiment

Next, a third embodiment will be described. A control system of the third embodiment includes a designating unit that designates repeatedly used data representing the data used repeatedly among a plurality of pieces of data stored in the main storage device 30. Moreover, the determining unit 82 of the third embodiment determines to stop the supply of power to a cache memory 6000 when the sum of the number of pieces of the cache data 61 identical to the repeatedly used data designated by the designating unit and the number of pieces of the cache data 61 read out onto the cache memory 6000 by prefetch among the cache data 61 stored in the cache memory 6000 is smaller than a threshold value. On the other hand, the determining unit 82 determines not to stop the supply of power to the cache memory 6000 when the sum of the number of pieces of the cache data 61 identical to the repeatedly used data and the number of pieces of the cache data 61 read out onto the cache memory 6000 by prefetch is not smaller than the threshold value. Although the control system is different from that of the first embodiment in the above respects, the same portions as the first embodiment will not be described by denoting them by the same reference numerals.

Figure 11:
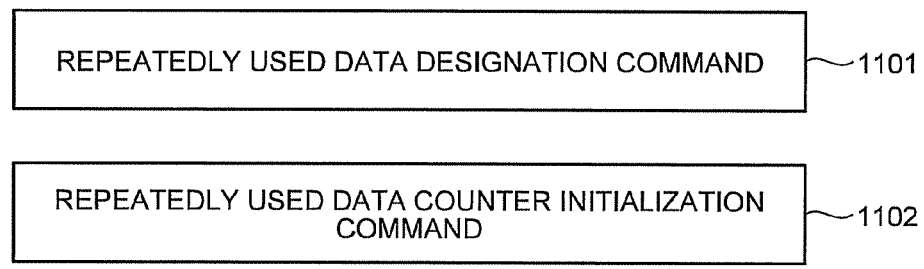
FIG. 11 is an exemplary diagram illustrating an example of a command executed by a processing device according to a third embodiment.

FIG. 11 is an exemplary diagram illustrating an example of a command executed by the processing device 10 according to the third embodiment. As illustrated in FIG. 11, the command executed by the processing device 10 includes a repeatedly used data designation command 1101 and a repeatedly used data counter initialization command 1102. The repeatedly used data designation command 1101 designates a header memory address of repeatedly used data and a data size in order to designate the range of repeatedly used data. The designating unit is a function realized when the processing device 10 executes the repeatedly used data designation command 1101. Moreover, when the processing device 10 executes the repeatedly used data counter initialization command 1102, the count value of a repeatedly used data counter 67 described later is initialized (reset) to "0".

Figure 12:
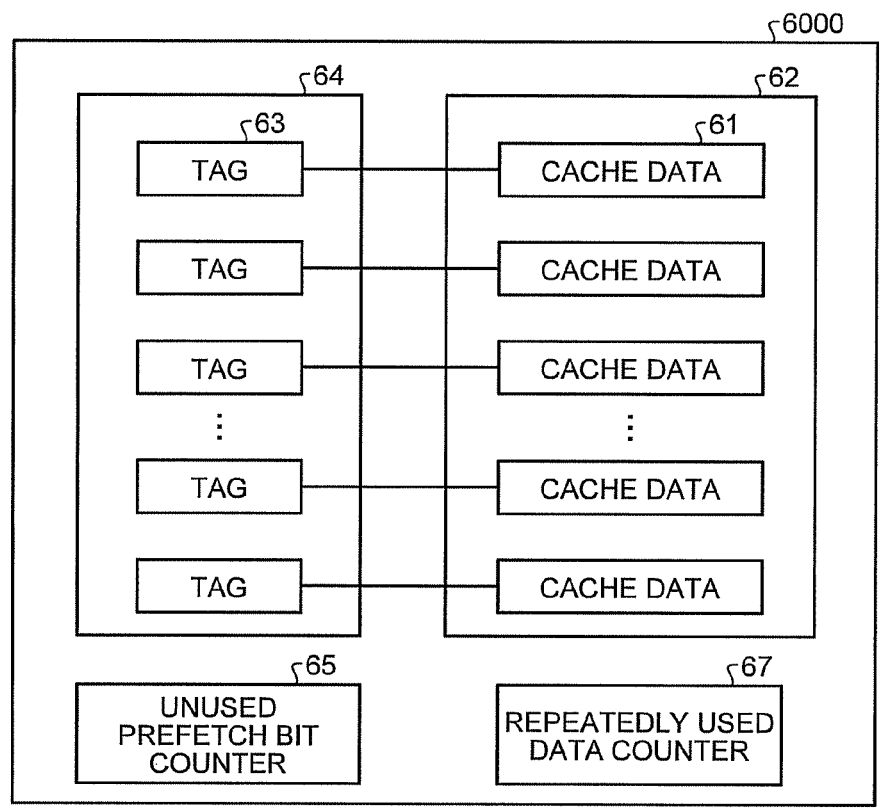
FIG. 12 is an exemplary block diagram of a cache memory according to the third embodiment.

FIG. 12 is an exemplary block diagram illustrating a configuration example of the cache memory 6000 according to the third embodiment. As illustrated in FIG. 12, the cache memory 6000 is different from that of the first embodiment in that the repeatedly used data counter 67 is further included. Moreover, the configuration of the tag 63 is different from that of the first embodiment. This will be described in detail below.

Figure 13:
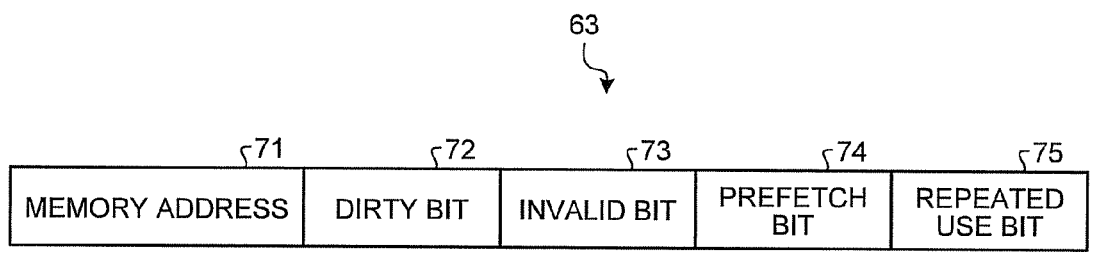
FIG. 13 is an exemplary diagram illustrating a configuration example of a tag according to the third embodiment.

FIG. 13 is an exemplary diagram illustrating a configuration example of the tag 63 according to the third embodiment. The tag 63 is different from that of the first embodiment in that it is configured to further include a repeated use bit 75. The repeated use bit 75 is information representing whether the corresponding cache data 61 is identical to the repeatedly used data designated by the designating unit. When the corresponding cache data 61 is identical to the repeatedly used data, the repeated use bit is set to "1". When the corresponding cache data 61 is not identical to the repeatedly used data, the repeated use bit is set to "0". When reading the data of the main storage device 30 on the cache memory 60 by prefetch, the cache controller 50 (the prefetch unit 52) sets the repeated use bit 75 to "1" when the read data is identical to the repeatedly used data and sets the repeated use bit to "0" when the read data is not identical to the repeatedly used data. Moreover, in the present embodiment, the repeated use bit 75 set to "1" maintains the value of "1" unless the repeatedly used data counter initialization command 1102 described above is executed. For example, even when the processing device 10 accesses the cache data 61 corresponding to the repeated use bit 75 set to "1", the value of the repeated use bit 75 is not reset to "0".

The description is continued by returning to FIG. 12. The repeatedly used data counter 67 counts the number of pieces of the cache data 61 identical to the repeatedly used data designated by the designating unit. More specifically, the repeatedly used data counter 67 counts the total number of the tags 63 in which the repeated use bit 75 is set to "1".

In the present embodiment, the determining unit 82 determines to stop the supply of power to the cache memory 60 when the sum of the count value of the unused prefetch bit counter 65 and the count value of the repeatedly used data counter 67 is smaller than a threshold value. On the other hand, the determining unit 82 determines not to stop the supply of power to the cache memory 60 when the sum of the count value of the unused prefetch bit counter 65 and the count value of the repeatedly used data counter 67 is not smaller than a threshold value. The threshold value can be set to an optional value. Since the threshold value depends on the performance of respective component modules of the control system 100, it is preferable to employ a value suitable for the control system 100.

Figure 14:
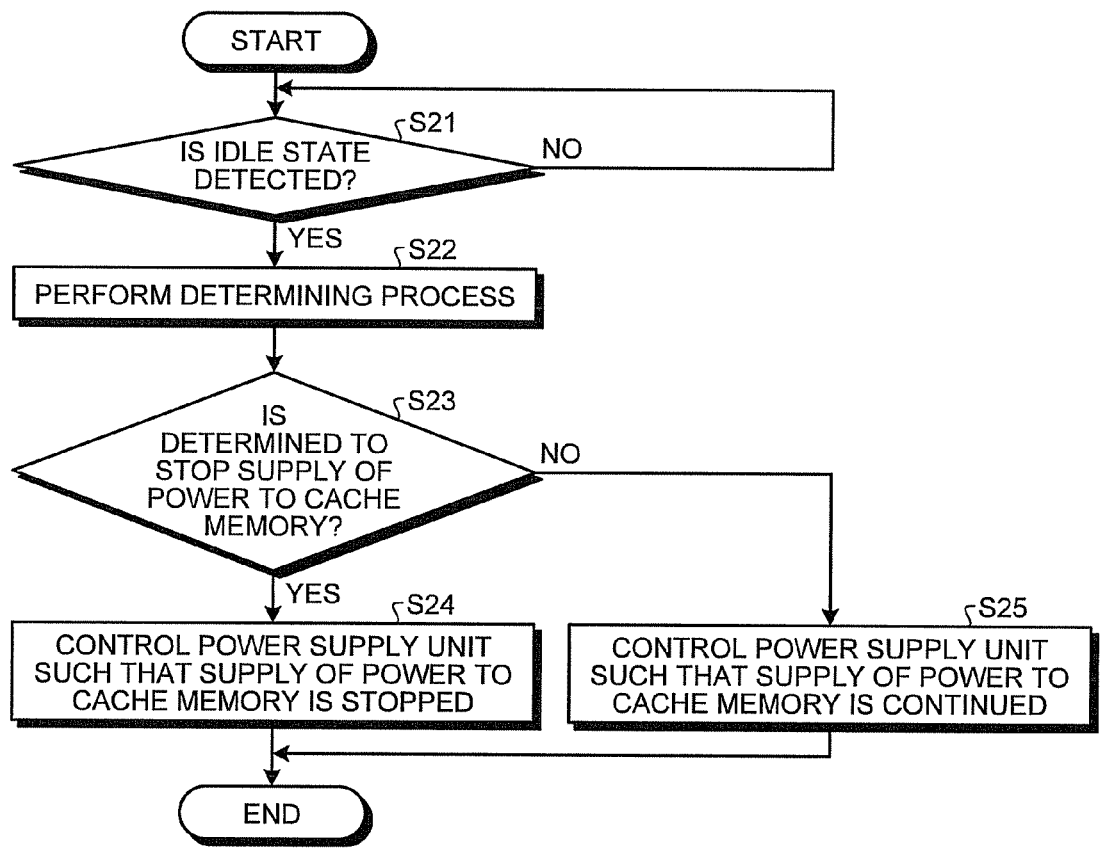
FIG. 14 is an exemplary flowchart illustrating an example of a power supply control process according to the third embodiment.

FIG. 14 is an exemplary flowchart illustrating an example of a power supply control process according to the third embodiment. Although the content of the determining process in step S22 is different from that of the first embodiment, the other contents are the same as those of the power supply control process according to the first embodiment.

Figure 15:
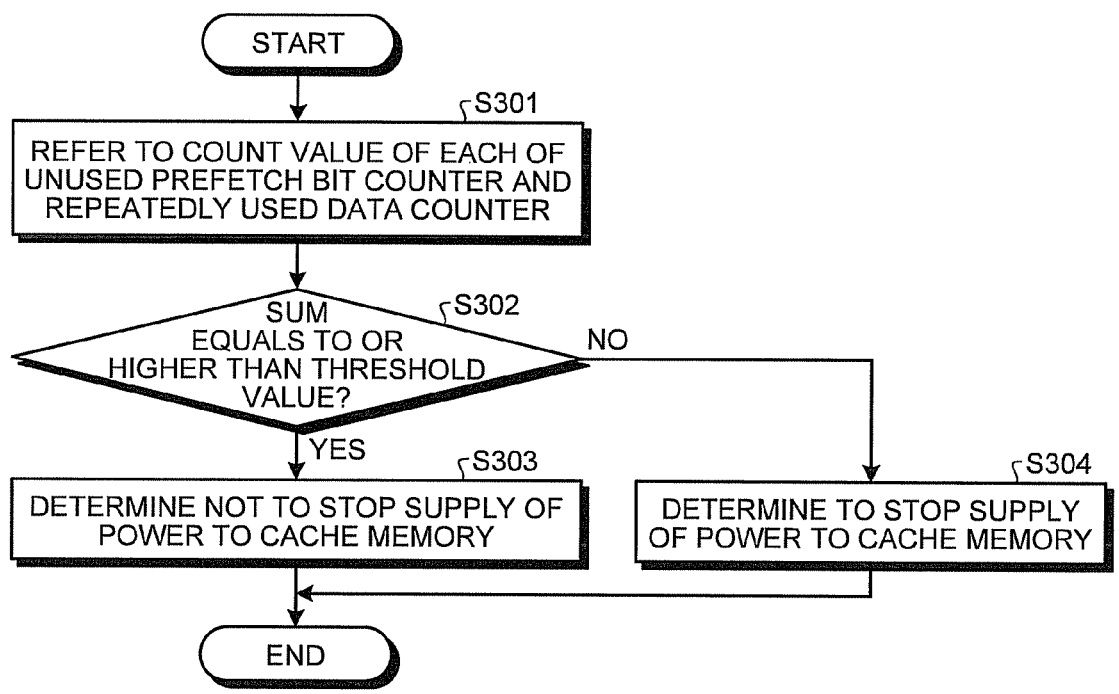
FIG. 15 is an exemplary flowchart illustrating an example of a determining process according to the third embodiment.

FIG. 15 is an exemplary flowchart illustrating an example of the determining process in step S22. As illustrated in FIG. 15, first, the determining unit 82 refers to the count value of each of the unused prefetch bit counter 65 and the repeatedly used data counter 67 (step S301). Subsequently, the determining unit 82 determines whether the sum of the count value of the unused prefetch bit counter 65 and the count value of the repeatedly used data counter 67 is not smaller than the threshold value (step S302). When the sum of the count value of the unused prefetch bit counter 65 and the count value of the repeatedly used data counter 67 is not smaller than the threshold value (Yes in step S302), the determining unit 82 determines not to stop the supply of power to the cache memory 60 (step S303). On the other hand, when the sum of the count value of the unused prefetch bit counter 65 and the count value of the repeatedly used data counter 67 is smaller than the threshold value (No in step S302), the determining unit 82 determines to stop the supply of power to the cache memory 60 (step S304). The determining process has been described above.

As described above, in the present embodiment, when the sum of the number of pieces of the cache data 61 identical to the repeatedly used data designated by the designating unit and the number of pieces of the cache data 61 read out onto the cache memory 60 by prefetch is not smaller than the threshold value, since the supply of power to the cache memory 60 is not stopped even when the processing device 10 is in the idle state, it is possible to prevent waste of power used for prefetch.

Moreover, the programs executed by the processing device 10 of the respective embodiments described above may be stored on a computer connected to a network such as the Internet and provided by downloading the programs via the network. Moreover, the programs executed by the processing device 10 of the respective embodiments described above may be provided or distributed via a network such as the Internet. Furthermore, the programs executed by the processing device 10 of the respective embodiments described above may be provided by being incorporated in advance in a ROM or the like.

While certain embodiments have been described, these embodiments have been presented by way of example only, and are not intended to limit the scope of the inventions. Indeed, the novel methods, systems and programs described herein may be embodied in a variety of other forms; furthermore, various omissions, substitutions and changes in the form of the methods, systems and programs described herein may be made without departing from the spirit of the inventions. The accompanying claims and their equivalents are intended to cover such forms or modifications as would fall within the scope and spirits of the inventions.

While certain embodiments have been described, these embodiments have been presented by way of example only, and are not intended to limit the scope of the inventions. Indeed, the novel embodiments described herein may be embodied in a variety of other forms; furthermore, various omissions, substitutions and changes in the form of the embodiments described herein may be made without departing from the spirit of the inventions. The accompanying claims and their equivalents are intended to cover such forms or modifications as would fall within the scope and spirit of the inventions.

What is claimed is:

1. A control system that includes
a processing device that processes data;
a main storage device that stores a plurality of pieces of the data;
a cache memory that stores part of the plurality of pieces of the data stored in the main storage device;
a prefetch unit that reads out part of the plurality of pieces of the data stored in the main storage device in advance, onto the cache memory; and
a power supply unit that supplies power,
the control system comprising:
a power supply control unit that controls the power supply unit so as to stop supplying of power to the cache memory when the processing device is in an idle state where the processing device is not executing processing and when the number of pieces of the data read out onto the cache memory by the prefetch unit is smaller than a threshold value; and controls the power supply unit so as to continue the supplying of power to the cache memory when the processing device is in the idle state and when the number of pieces of the data read out onto the cache memory by the prefetch unit is equal to or larger than the threshold value.

2. The control system according to claim 1, further comprising
a detecting unit that detects whether the processing device is in the idle state.

3. The control system according to claim 2, further comprising
a determining unit that
determines to stop the supplying of power to the cache memory when the processing device is detected as being in the idle state and when the number of pieces of the data read out onto the cache memory by the prefetch unit is smaller than the threshold value; and
determines not to stop the supplying of power to the cache memory when the processing device is detected as being in the idle state and when the number of pieces of the data read out onto the cache memory by the prefetch unit is equal to or larger than the threshold value.

4. A power supply system that includes
a processing device that processes data;
a main storage device that stores a plurality of pieces of the data;
a cache memory that stores part of the plurality of pieces of the data stored in the main storage device;
a prefetch unit that reads out part of the plurality of pieces of the data stored in the main storage device in advance, onto the cache memory; and
a power supply unit that supplies power, the power supply system comprising:
a power supply control unit that
controls the power supply unit so as to stop supplying of power to the cache memory when the processing device is in an idle state where the processing device is not executing processing and when the prefetch unit is unable to predict the data which is highly likely to be accessed in future; and
controls the power supply unit so as to continue the supplying of power to the cache memory when the processing device is in the idle state and when the prefetch unit is able to predict the data which is highly likely to be accessed in future.

5. The power supply system according to claim 4, further comprising
a detecting unit that detects whether the processing device is in the idle state.

6. The power supply system according to claim 5, further comprising
a determining unit that
determines to stop the supplying of power to the cache memory when the processing device is detected as being in the idle state and when the prefetch unit is unable to predict the data which is highly likely to be accessed in future; and
determines not to stop the supplying of power to the cache memory when the processing device is detected as being in the idle state and when the prefetch unit is able to predict the data which is highly likely to be accessed in future.

7. A control system that includes
a processing device that processes data;
a main storage device that stores a plurality of pieces of the data;
a cache memory that stores part of the plurality of pieces of the data stored in the main storage device;
a prefetch unit that reads out part of the plurality of pieces of the data stored in the main storage device in advance, onto the cache memory; and
a power supply unit that supplies power, the control system comprising:
- a designating unit that designates repeatedly used data representing data used repeatedly among the plurality of pieces of the data stored in the main storage device; and
- a power supply control unit that
  - controls the power supply unit so as to stop supplying of power to the cache memory when the processing device is in an idle state where the processing device is not executing processing and when a sum of the number of pieces of the data identical to the repeatedly used data designated by the designating unit and the number of pieces of the data read out onto the cache memory by the prefetch unit among the data stored in the cache memory is smaller than a threshold value; and
  - controls the power supply unit so as to continue the supplying of power to the cache memory when the processing device is in the idle state and when the sum of the number of pieces of the data identical to the repeatedly used data and the number of pieces of the data read out onto the cache memory by the prefetch unit is equal to or larger than the threshold value.

8. The control system according to claim 7, further comprising
- a detecting unit that detects whether the processing device is in the idle state.

9. The control system according to claim 8, further comprising
- a determining unit that
  - determines to stop the supplying of power to the cache memory when the processing device is detected as being in the idle state and when the sum of the number of pieces of the data identical to the repeatedly used data designated by the designating unit and the number of pieces of the data read out onto the cache memory by the prefetch unit among the data stored in the cache memory is smaller than the threshold value; and
  - determines not to stop the supplying of power to the cache memory when the processing device is detected as being in the idle state and when the sum of the number of pieces of the data identical to the repeatedly used data and the number of pieces of the data read out onto the cache memory by the prefetch unit is equal to or larger than the threshold value.

10. A controlling apparatus that
controls a power supply unit so as to stop supplying of power to a cache memory when a processing device is in an idle state where the processing device is not executing processing and when the number of data streams predicted by the processing device is smaller than a threshold value; and
controls the power supply unit so as to continue the supplying of power to the cache memory when the processing device is in the idle state and when the number of the data streams predicted by the processing device is equal to or larger than the threshold value.

11. An information processing apparatus comprising:
a processing device that performs processing, wherein
  the processing device
    predicts a data stream;
    stops supplying of power to a cache memory when the processing device is in an idle state where the processing device is not executing the processing and when the number of data streams predicted by the processing device is smaller than a threshold value; and
    continues the supplying of power to the cache memory when the processing device is in the idle state and when the number of the data streams predicted by the processing device is equal to or larger than the threshold value.

12. A controlling apparatus that
controls a power supply unit so as to stop supplying of power to a cache memory when the number of data streams predicted by a processing device is smaller than a threshold value and when the processing device becomes in an idle state where the processing device is not executing processing; and
controls the power supply unit so as to continue the supplying of power to the cache memory when the number of the data streams predicted by the processing device is equal to or larger than the threshold value and when the processing device becomes in the idle state.

13. An information processing apparatus comprising:
a processing device that performs processing, wherein
  the processing device
    predicts a data stream;
    stops supplying of power to a cache memory when the number of data streams predicted by the processing device is smaller than a threshold value and when the processing device becomes in an idle state where the processing device is not executing the processing; and
    continues the supplying of power to the cache memory when the number of the data streams predicted by the processing device is equal to or larger than the threshold value and when the processing device becomes in the idle state.

* * * * *